United States Patent [19]
Schuhmann

[11] 3,807,820
[45] Apr. 30, 1974

[54] ARRANGEMENT FOR MOUNTING BEARINGS

[75] Inventor: Peter Schuhmann, Olching, Germany

[73] Assignee: SKF Industrial Trading and Development Company N.V., Amsterdam, Netherlands

[22] Filed: Aug. 17, 1972

[21] Appl. No.: 281,294

[30] Foreign Application Priority Data
Aug. 18, 1971 Germany.......................... 7131568

[52] U.S. Cl. .............................................. 308/236
[51] Int. Cl. ........................................... F16c 35/06
[58] Field of Search ....... 287/52.06, 58.09; 308/236

[56] References Cited
UNITED STATES PATENTS
2,098,709 11/1937 Murden et al. ..................... 308/236
2,482,662 9/1949 Dunne ........................... 287/52.06

Primary Examiner—Charles J. Myhre
Assistant Examiner—Frank Susko
Attorney, Agent, or Firm—Murray Schaffer

[57] ABSTRACT

An arrangement for mounting a bearing to the surface of a machine part in which the bearing has an inner and an outer race ring. The race ring opposed to the machine part is formed with a conically tapered surface forming a corresponding space therebetween. A radially extending annular flange is provided along the edge of the conically formed ring and a wedge block is located within the space. The arrangement is provided with screw means by which the block is securely pressed and forced into engagement with both the conical surface and the surface of the machine part.

9 Claims, 2 Drawing Figures

ARRANGEMENT FOR MOUNTING BEARINGS

BACKGROUND OF INVENTION

The present invention relates to an arrangement for fastening machine elements such as roller bearings and the like on rotating shafts, in journal housings and the like.

In mounting bearings for supporting rotary shafts in pillow blocks, journal housings and the like it is necessary to insure that no relative motion exists between the bearing and the shaft or housing on which it is secured. Even the smallest of such relative motion between the engaging faces can, over a period of time, result in severe corrosion to the surfaces. Such corrosion damages the engaging faces and make the dismantling of the bearing difficult and the reuse of the machine part or bearing part impossible. It is therefore essential that the machine element or bearing be securely fastened to the shaft or the associated housing in order to prevent relative movement, wandering or creeping between the parts.

It has been known to fasten bearing on shafts by using eccentric rings adapted to sit on the side of an inner race ring provided with its own eccentric ring face. By turning the eccentric ring with respect to the inner ring the bearing can be securely fastened. The seated, located on one side of the inner race ring, produces a contact between the shaft and inner race ring only at certain defined places. At the other places about the circumference of the shaft a gap or space exists between it and the bearing part. It is in these free places that corrosion and rust first appear and are built up. As a result the bearing parts and shaft freeze together, so that when the parts are dismantled the bearing is easily damaged and may not be reusable.

It is also known to fasten machine parts to shafts using clamping blocks. Such blocks generally took the form of split sleeves having cylindrical bores, conical outer surfaces and stamped tongues. However, once the machine parts were placed in operation these parts, particularly the tongues tended to bend and deform. These blocks could only be used once and when the bearing was demounted a new one had to be used.

It was also known to employ several embodiments of bracing sleeves which had a conical cut-out portion which was braced with the machine part by itself or with the use of additional conical wedge like bodies. The bracing sleeve was also provided with a slot which carried means for axially sliding the brace. These braces were retained against becoming loose by using a tightening nut and a retaining plate at the small end of the conical outer surface. This made the device relatively large in the axial direction, and in many cases could not be used because the lack of room and difficulty in assembling the device in place.

It is the object of the present invention to provide for the fastening of machine parts such as bearings on shafts, housing and the like in which the disadvantages of the prior art are overcome.

It is a further object of the present invention to provide a bearing capable of being fastened on a bearing shaft, which insures secure locking, prevents relative movement and wandering of the parts.

It is a further object to provide a device of the type described which is simple, economical, and easy to apply to either shaft or housing and requires manipulation from only one side.

It is another object of the present invention to provide a device of the type described which is easily demounted and capable of indefinite reuse.

It is another object of the present invention to provide a device of the type described which significantly prevents corrosion from occurring between the mating and engaging parts.

These objects as well as others, together with the advantages of the present invention will be seen from the following disclosure.

SUMMARY OF INVENTION

According to the present invention an arrangement for mounting a bearing to the surface of a machine part is provided, in which the bearing has an inner and an outer race ring. The race ring opposed to the machine part is formed with a conically tapered surface forming a corresponding space therebetween. A radially extending annular flange is provided along the edge of the conically formed ring and a wedge block is located within the space. The arrangement is provided with screw means by which the block is securely pressed and forced into engagement with both the conical surface and the surface of the machine part.

In accordance with the present invention, the arrangement may be used to fasten bearings to rotating shafts, or to the journal housing itself. In the first instance, the inner race ring is provided with the conical surface on its inner face and is provided with the radial flange at the end having the widest radial opening. In the second instance the outer race ring is provided on its outer surface or shell with the conical surface and is provided with an annular flange extending radially outward at the edge having the smallest radius. In either case the flange is provided with a plurality of axial holes in which fastening means such as set-screws are located and adapted to bear on the axial enlarged end of the wedge block. By turning the set-screws the edge block can be pressed to form a completely tight lock between the bearing ring and the machine part.

It is preferred that the wedge block be annular and provided with an axial slit, in the manner of a split ring. In this manner as the block is wedged and pressed into place it can contract or expand to engage substantially all of the corresponding mating surfaces in which it is in contact with. The surfaces of the wedge blocks conform to the contour of the surfaces of the races, the shaft and machine part to which it corresponds.

In either case, the flange may be made as an integral part of the race ring or it may be separable. If it is separably made it may be preferred to provide the associated race ring with a groove in which it seats and to provide the flange also a split ring so that it has a degree of resiliency holding it normally in place. The flange may also be formed as part of a ring nut arranged axially at the end of the race.

The following is a complete description of the invention with respect to its embodiment in a bearing adapted to be secured to a shaft. The embodiment whereby the bearing may be secured to a surrounding housing will be clearly obvious, although not shown in the drawings.

DESCRIPTION OF AN EMBODIMENT OF THE INVENTION

Figure 1:
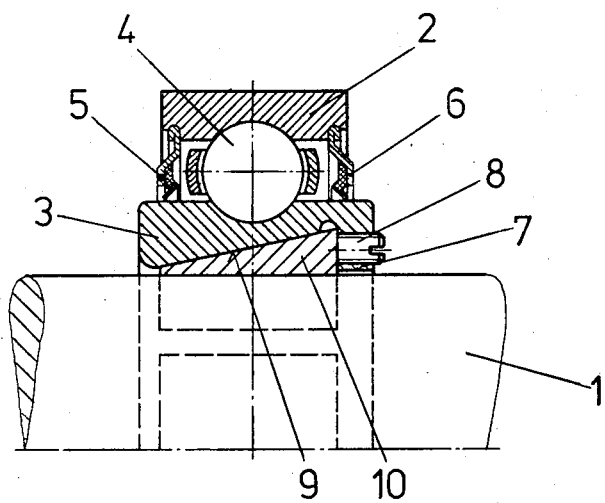
FIG. 1 is a sectional view of bearing secured to a shaft showing the upper half only.

FIG. 1 shows the upper half of a circumferentially grooved radial roller bearing in which the arrangement for anchoring the bearing parts on a shaft according to the present invention is exemplified. The bearing is mounted, for example, on a cylindrical shaft 1 having an axis X-X and comprises an outer annular race ring 2, an inner annular race ring 3, and a plurality of roller bodies 4 located therebetween. The roller bodies 4 are held in a suitable cage to run within the circular race groove of the inner and outer rings. The interior annular space between the races of the bearing is sealed by annular seal rings 5 and 6 set within retaining grooves formed on the inner face of the outer ring 2.

The inner surface 9 of the ring 3 (i.e. the surface opposed to the surface of the machine shaft) is tapered conically in the axial direction to provide a bore enlarged at one end into which a conical wedge block 10 is set. The wedge 10 is split axially as seen in the dotted lines and thus has a degree of radial resiliency. It is formed of suitable material for use in a bearing which material is similar to that used in roller balls or the like. The wedge has an outer surface conforming to the conical bore defined by surface 9 and an inner surface conforming to the surface of the shaft 1 with both of which it is adapted to engage. In this embodiment, the wedge 10 is retained by the race ring 3 which is provided with an integral radially inwardly directed flange 7 at the enlarged end of the bore 9. The inner edge of the flange 7 axially abuts the wedge 10 and holds it in place against axial movement. Arranged about the circumference of the flange 7 are a plurality of axially extending threaded holes in which a set-screw 8 is located in engagement with the wide end of wedge 10. In screwing the set-screw 8 into the flange 7 it presses against the wedge 10 forcing the wedge under high pressure engagement axially with and between the surface of the conical bore 9 and the surface of the shaft 1. In this manner, the inner race 3 of the bearing is firmly secured in lock-tight arrangement to the shaft 1. Simultaneously, a correspondingly broad engaging face between the wedge and shaft 1 is provided about the entire circumference of the shaft, since the wedge 10 is adapted to extend substantially about the entire circumference of the shaft and under wedging pressure to close its slit tightly about the shaft.

Figure 2:
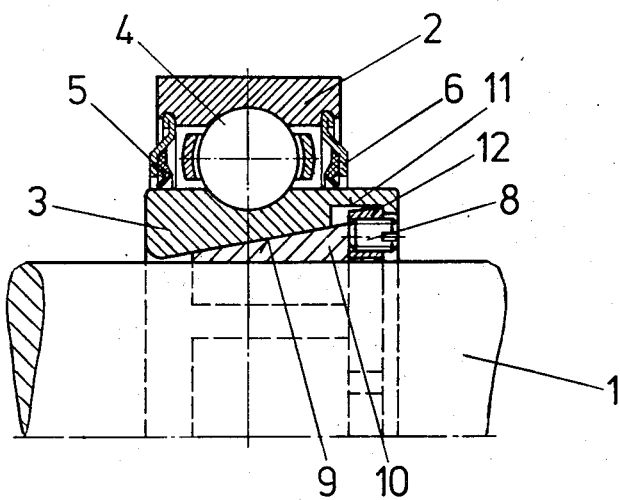
FIG. 2 is a sectional view showing the vearing of FIG. 1 with a modified retaining flange.

In FIG. 2, another version is shown where the inner ring 3 is worked along its inner face adjacent the enlarged end to form an annular groove 11 and a loose or removable flange 12 is set within the groove 11. The flange 12 preferably, as is shown in the drawing by the dotted lines, is formed like a split ring so that it can be easily snapped within and resiliently held in the groove 11.

Arranged about the circumference of the flange 12 seen in FIG. 2, are a plurality of threaded holes in which set-screws 8 are located. The bracing of the inner rings 3 with the shaft 1 by means of the wedge 10 follows exactly in the manner described in connection with FIG. 1.

The major advantage of the present invention is the ability to tightly and securely brace and anchor the inner ring to the rotating shaft. By providing mating counter-part sections, in the bore 9 and wedge 10, the machine element, namely the bearing can be firmly seated and locked in place on the shaft, and be prevented from wandering, creeping or otherwise moving relatively to each other. As a result, the engaging parts are prevented from damaging each other and prevented from corroding in those vital portions. Further, the distortion of the wedge during dismantling is prevented, in spite of the relative ease and simplicity by which the bearing may be removed from the shaft. It will also be observed that the bearing is simple and may be installed easily by manipulation at only one of its axial sides.

While a bearing is shown employing an inner ring 3 which is wider than the outer ring 2 for the purpose of increasing the surface of engagement between the coresponding parts, it will be obvious that a more normally constructed ring having an axially smaller dimension may be used.

It is obvious that by placing the bearing within an annular outer housing and providing the outer ring 2 or bearing sleeve with a conical taper opposed thereto, and a retaining flange extending radially outward, a wedge block may be used to securing the bearing in similarly tight fashion. This embodiment is virtually a mirror image reflection of the one shown. Such details have been indicated in the foregoing summary.

Various other changes and modifications can be made within the scope of the invention and it is to be understood that the present disclosure is illustrative and not limiting of the invention.

What is claimed:

1. An arrangement for mounting a bearing to a machine part, comprising a bearing having an outer race ring and an inner race ring, one of which is adapted to be secured to the surface of a machine part, said one ring having an axially conically tapered surface forming with respect to the machine part a corresponding annular space, a wedge block slidably located within said space, an annular retaining ring located adjacent said wedge and means along the edge of said one race ring for axially securing said retaining ring, said retaining ring having a plurality of axially threaded holes therein and screw means located in said holes bearing against said wedge block whereby said wedge block may be slid along the surface of said machine part.

2. The arrangement according to claim 1 including a machine part comprising a shaft, wherein said one race ring is said inner race ring, and wherein said means for axially securing said retaining ring comprises a flange extending radially inward of said ring at the edge of said conical race surface having the largest diameter.

3. The arrangement according to claim 1 including a machine part comprising an annular housing surrounding said bearing and said one race ring is said outer race ring, and wherein means for securing said retaining ring comprises a flange extending radially outward at the edge of said conical surface having the smallest diameter.

4. The arrangement according to claim 1 wherein said wedge block comprises an annular ring havint its surfaces conforming to the surfaces of the race ring and is adapted to conform to machine parts to which they engage.

5. The arrangement according to claim 1 wherein said retaining ring is axially split.

6. The arrangement according to claim 2 wherein said flange is integrally formed with said inner race ring and the annular retaining ring.

7. The arrangement according to claim 1 wherein said annular retaining ring is separable from said one race ring and is provided with means for securing the same thereon.

8. The arrangement according to claim 7 wherein said means for securing said annular retaining ring includes a groove in said one race ring in which said retaining ring is seated.

9. The arrangement according to claim 3 wherein said flange is integrally formed with said outer race ring and forms the annular retaining ring.

* * * * *